United States Patent    [15] 3,654,426
Brinkmann et al.    [45] Apr. 4, 1972

[54] METHOD AND MEANS FOR PREHEATING ELECTRIC ACCUMULATORS SUCH AS LEAD-ACID STORAGE BATTERIES

[72] Inventors: Jürgen Brinkmann; Wieland Gehrke, both of Berenbostel, Germany

[73] Assignee: Varta Aktiengesellschaft, Frankfurt/Main, Germany

[22] Filed: Apr. 13, 1970

[21] Appl. No.: 27,752

[30] Foreign Application Priority Data

Apr. 12, 1969   Germany ................. P 19 18 726.9

[52] U.S. Cl. .................................................. 219/209, 320/2
[51] Int. Cl. ........................................................ H05b 1/00
[58] Field of Search .................. 219/6, 5, 209, 10.41, 10.43, 219/10.47, 10.49, 10.51, 10.57, 10.75; 136/161; 320/35, 36, 2

[56] References Cited

UNITED STATES PATENTS

| | | | |
|---|---|---|---|
| 1,023,791 | 4/1912 | Anderson | 219/10.49 |
| 2,462,072 | 2/1949 | Darmara | 219/10.43 |
| 2,689,322 | 6/1954 | Godshalk et al. | 320/35 X |
| 2,710,936 | 6/1955 | Lowry et al. | 320/35 X |
| 3,264,546 | 8/1966 | Foster | 320/35 |

OTHER PUBLICATIONS

Rheinstahl Henschel A.G., 1,496,134, 12/12/64,

*Primary Examiner*—C. L. Albritton
*Attorney*—Curt M. Avery, Arthur E. Wilfond, Herbert L. Lerner and Daniel J. Tick

[57] ABSTRACT

Storage batteries, particularly those of the lead-acid type, are preheated electrically by subjecting the electrode plates of the battery to an inductive alternating field which induces electric current in the plates. The frequency of the inductive field preferably is within the range from about 250 Hz. to 1,500 Hz. The intensity of the field is reduced or the heating field is terminated upon a sufficient rise in plate temperature.

22 Claims, 7 Drawing Figures

METHOD AND MEANS FOR PREHEATING ELECTRIC ACCUMULATORS SUCH AS LEAD-ACID STORAGE BATTERIES

Our invention relates to methods and means for preheating electric accumulators of the type that exhibit optimum performance within a given range of temperatures, this being particularly the case with lead-acid storage batteries. More specifically, the invention concerns a heating method and heating device which effects the desired preheating by means of electrical current.

In a more particular aspect, the invention relates to storage batteries connected with or incorporated in the electric wiring system on an automobile, boat or other automotive vehicle, especially vehicles equipped with an internal combustion engine which drives a direct-current or alternating-current generator (alternator) for energizing the electric system and in which the storage battery, charged from the generator or alternator, serves to operate an electric motor for starting the engine.

The power delivery and the power storage capacity of storage batteries is greatly dependent upon temperature. At extremely low temperatures, even a fully charged storage battery may not be capable of furnishing the power required for starting the engine of the vehicle. Since with increasing temperature the required starting power decreases while the power dischargeable from the battery increases, the starting performance can be improved by preheating the driving assembly and the storage battery. The high-current capacity of storage batteries at low temperatures is particularly slight when the battery is only partially charged. Hence, to prevent starting trouble at low temperatures, the storage battery must always be kept in good charged condition. This calls for fastest feasible preheating of the battery when operating the vehicle so as to secure a high charging rate for a given constant charging voltage. For vehicles equipped with devices that consume relatively large amounts of electric energy, consuming load devices, such as window opening drives, heaters and air-conditioners, that may operate at standstill of the driving engine, it is desirable that during the next running periods of the engine the storage battery will reliably reach the heated state at which it will again be charged as rapidly as feasible.

Problems of this kind are particularly apt to occur with heavy military vehicles, for example with military tanks or the like armored vehicles, so that on such vehicles the batteries are often provided with means for maintaining them in heated condition.

Various battery heating methods have been proposed. For example, it is known to provide for hot-air heating of a storage battery with the aid of a flow of heated air which passes around the block container of the battery. The heat must penetrate through the block container into the interior of the battery. Thus the electrolyte at the inner surfaces of the battery container becomes heated first; and convection or circulation of the acid in the container, caused by the resulting differences in density and by heat-conductance, then causes the entire storage battery to be heated ultimately.

For a given temperature difference between the battery interior and the heating air, the temperature rise in the storage battery is substantially dependent upon the heat conductivity of the container material rather than upon the heat transfer at the inner surface of the container wall. For this reason, other heating media, for example heated water, applied under otherwise similar conditions, cannot appreciably increase the rate of temperature change. In addition, when using water as heating medium, the predetermined temperature difference, generally, is smaller than when heated air is used because the water temperature must remain below the boiling point.

With any heating methods that require the heat to penetrate through the block container into the interior, the efficiency of the heating performance is rather small because the difference in thermal resistivities causes the major portion of the heat quantity to dissipate into the environment rather than reaching the interior of the battery. Furthermore, the individual cells of the battery have considerably different external surfaces so that the heat transfer faces correspondingly differ from one another. As a result, the outer or end cells of the storage battery, when being preheated in this manner, assume a higher temperature than the inner cells, which leads to different power storage capacities of the respective cells.

For shortening the preheating period of storage batteries it has been proposed to intensively heat the armature components of the battery, for example the cell connectors and the end poles so that the heat is conducted through the pole shanks into the interior of the battery. Despite the good heat conductivity of the lead material which forms the electrode plates in a lead-acid type battery, the thermal resistance is very large on account of the relatively slight heat-conducting cross section and the long path length. Furthermore, with this heating method the heat is first issued to the planar layers of the electrolyte in the storage cell so that a natural circulatory motion of the electrolyte is not effected to an appreciable extent. That is, the heat must be predominantly transported by conductance to the lower zones of the battery. Besides, the temperature up to which the armature components can be heated must not exceed a given, rather low limit because the connectors and the pole lead-ins are arranged in a fusible casting mass of low maximum permissible temperature.

According to another proposal, the storage battery is heated directly by passing therethrough an electric current of medium frequency. The losses occurring in the internal resistances then cause preheating of the battery. Since the internal resistances of the battery are slight, an effective heating in this manner requires applying a very high current of low voltage. This not only calls for unfavorably large cross sections of the electrical supply leads, but the development of heat is largely situated within the electrolyte while the plates of the battery remain relatively cold. Furthermore, the internal resistance of the battery declines with increasing temperature so that the medium-frequency current passing through the battery increases steeply as the heating time progresses. This method also poses the danger that the storage battery may discharge through the relatively slight internal resistance of the alternating-current generator, so that it is necessary to provide additional capacitors or, since capacitors for high current intensities are too large and too expensive, the battery must be subdivided into groups to be fed with alternating heating current in a series-opposed circuit connection. With this heating method, it is not possible to simultaneously charge or discharge a storage battery since high alternating voltages are impressed upon its terminals during the heating period.

In the above-mentioned circuit arrangement of capacitors, these capacitors prevent the flow of the direct current. When subdividing the storage battery into groups, it is necessary to change the circuit connection of the groups upon termination of the preheating period, or a portion of the groups can be discharged only through the internal resistance of the alternating current generator. This results in an asymmetry of the individual battery groups and also impairs the current-voltage characteristic of the battery, which is disadvantageous particularly to the engine-starting performance.

It is an object of our invention to minimize or eliminate the above-mentioned disadvantages and shortcomings of the known methods and means for preheating of storage batteries.

More specifically, it is an object of our invention to devise a method and means which afford preheating the storage battery in shortest feasible time to such an extent that a good power delivering capacity and thereby a satisfactory engine-starting performance or an improved power storing ability are achieved.

Another object of the invention, in conjunction with those mentioned, is to afford readily charging or discharging a storage battery during the heating operation.

To achieve these objects and the further objects apparent from the following, and in accordance with a feature of our invention, we effect the preheating of storage batteries by subjecting the electrode plates of the battery to an alternating inductive field, thus inducing electric heating currents directly in the electrode plates of the battery.

Accordingly, we provide a battery container or holder structure with an inductive excitation or primary winding which extends about the storage battery and is so situated that the electrode plate structures, preferably the grid structures of the lead plates in a lead-acid type battery, constitute the secondary windings in which the currents, circulating within the respective plates, are induced.

As a result, the plate electrodes of the storage battery are simultaneously heated to a substantially uniform extent, the lead grids of the electrode plates acting as short-circuited windings in the magnetic alternating field of the primary winding. On account of the slight electrical resistances, the induced voltages produce high-intensity currents well suitable to heat the grid structures of the plate. Thence, the heat passes to the active mass of the electrode plate and subsequently to the electrolyte contained in the pores of the mass. This heat transfer reflects but a slight jump in temperature, because the heat transfer surface between active mass and electrolyte within the pores is constituted by the very large totality of the pore surfaces. In this manner, the localities at which those electrochemical energy conversions take place that ultimately determine the power capacity of the storage battery, are intensively heated. This applies particularly to the boundary faces between active mass and electrolyte. The acid between the plates, in the sludge space and above the sets of plates, will at first remain cold since the heat transfer from the active mass and the acid in the pores to the other acid portions is relatively poor, having only the geometric surface of the plates available as heat transfer surface. However, the acid between the plates need not necessarily be heated because the electrical conductivity of the acid at this locality has no more than a negligible effect upon the electrical operating qualities of the storage battery. As a consequence, the battery electrically behaves as if it had a high temperature, although the acid, in reality, exhibits a much lower temperature average value. The advantages of this type of heating resides particularly in the fact that the localities at which the charging and discharging rate determining reactions take place, these being critical to the power storing and delivering capacity of the battery, are directly heated and that the specific heat of lead is only about 3 percent of the specific heat of the electrolyte. As a consequence, a storage battery can rapidly and with a slight energy consumption be placed into a state of good electrical conduction ability.

The above-mentioned and other objects, advantages and features of our invention will be apparent from, and will be set forth in, the following description of embodiments of the invention illustrated by way of example on the accompanying drawings, in which.

Figure 1:
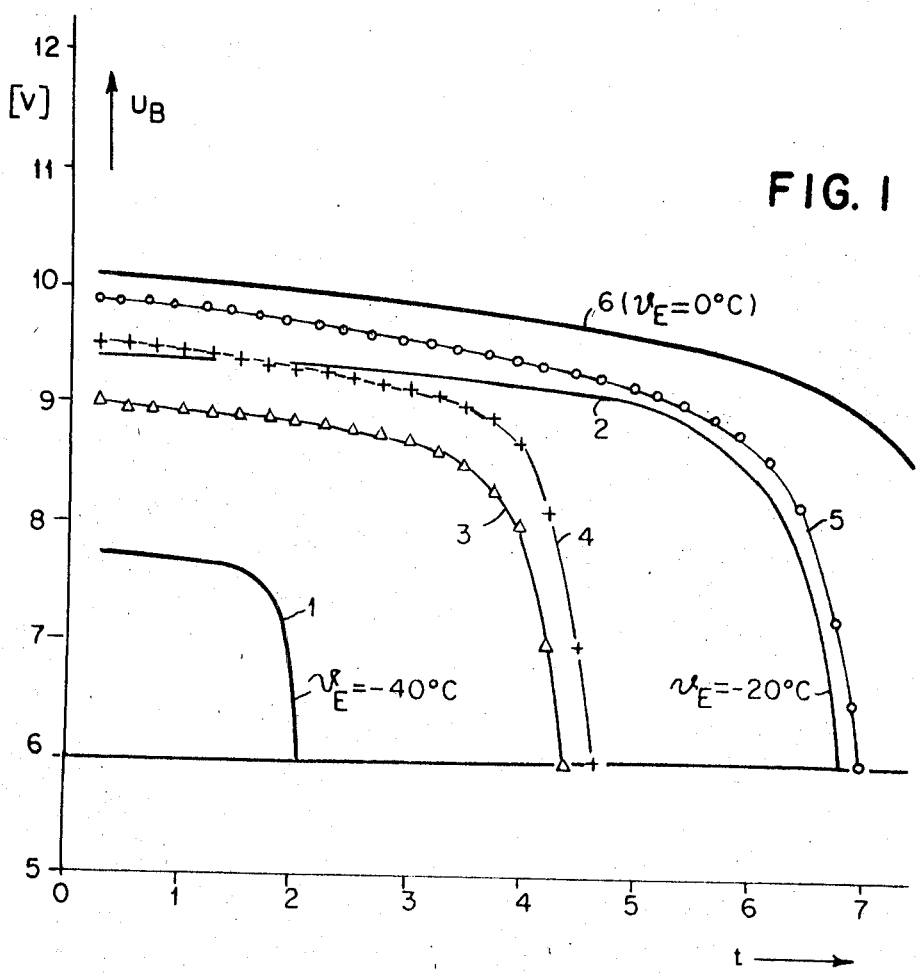
FIG. 1 is an explanatory diagram.

The coordinate diagram in FIG. 1 relates to the discharging characteristic of heated and unheated lead-acid batteries having a storage capacity of 100 Ah (ampere hours) which were discharged by a discharge current of 300 A from a 100 percent charging capacity at the start of the discharge. In the diagram, the abscissa denotes time ($t$) and the ordinate denotes voltage (V).

Curve 1 indicates the discharging characteristic of a storage battery at a temperature of −40° C. This curve as well as all others are shown down to the final discharging voltage of 6 V.

Curve 2 shows the discharging characteristic at −20° C and curve 6 the characteristic at 0° C. Curves 3, 4 and 5 represent the discharge characteristics of inductively heated storage batteries at a discharge current of 300 A. The heating frequency in these cases was about 900 Hz, the heating current was 30 A and the heating voltage 30 V. The starting temperature of the heated batteries was at −40° C. For curve 3 the heating period was 6 minutes, for curve 4 it was 9 minutes, and for curve 5 the heating lasted 15 minutes. It will be seen that by virtue of inductive heating a considerably improved voltage characteristic and hence power delivery was obtained with a heating period of as little as 6 minutes (curve 3). With a heating period of only 9 minutes (curve 4) the battery obtained a starting voltage (9, 5 V) virtually just as large as if the temperature of the battery had been −20° C (curve 2). However, since with curve 4 the final discharge voltage of 6 V was attained earlier than with curve 2, it will be recognized that the battery had the higher temperature of −20° C (as compared with −40° C) only at its active localities. Curve 5 relates to a heating period of 15 minutes. In this case, with respect to the starting voltage (near 10 V), the discharge curve 6 for 0° C was almost reached and, with respect to the discharging duration, the discharge curve for −20° C (curve 2) was already exceeded although the battery during this short preheating period had not yet attained a median temperature of −20° C.

A variety of devices are applicable for performing the above-described method according to the invention. In a particularly simple form, for example, the battery to be heated is shoved into a ring coil to serve as the primary winding of the induction heating system. Such an embodiment will be more fully described hereinafter with reference to FIG. 6 where each battery B is inserted into one of the induction heater coils 51 to 54. For reasons of space requirements, this type of device cannot always be employed. As a rule, therefore, it is preferable to arrange the primary induction heater winding as represented in FIGS. 2a and 2b.

Figure 2A:
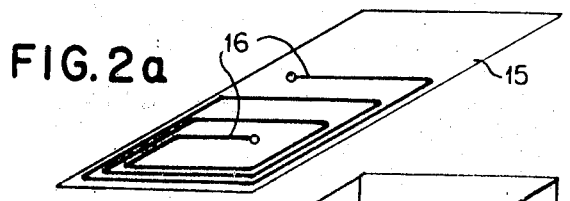
FIG. 2a and FIG. 2b show schematically the cover and the container structure of a battery equipped with induction heating means according to the invention.
Figure 2B:
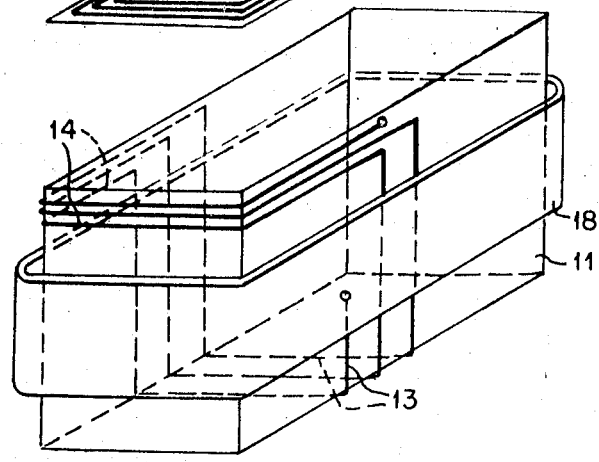

According to FIGS. 2a and 2b, the primary winding is attached to the block container 11 of the battery with the winding turns or portions so distributed that there occurs a distributed winding 13 at the bottom and the lateral walls of the battery container, whereas the winding 14 at the upper edge of the block container is concentrated, i.e., the turns or turn portions at this locality are more closely spaced from each other. The cover 15 of the battery container is similarly provided at its surface with a distributed winding 16 and at the edges with a concentrated winding 17. By such a distribution of the winding portions, a largely homogeneous field in the interior of the storage battery is secured. For obtaining a good magnetic flux path, it is preferable to place flux guide sheets 18 around the winding. This reduces the excitation power required for producing a given induction desired in the interior of the battery; that is, the flux guide members 18 permit reducing the necessary amount of magnetic ampere turns. To attain a concentration of the magnetic field in the area predetermined by the dimensions of the electrode plates, it is advisable to mount the flux guide members 18 at about the same height as the electrode plates of the battery and to arrange the flux-guide members approximately at the height of the plates outside on the primary induction winding. This has the effect that the predominant portion of the magnetic field produced by the excitation winding will pass as useful flux through the electrode-plate areas, thus securing an almost complete linkage of the flux between the secondary winding (electrode plates) and primary winding. This serves to reduce the reactive-power demand and ultimately to increase the efficiency of the heating device.

Figure 3:
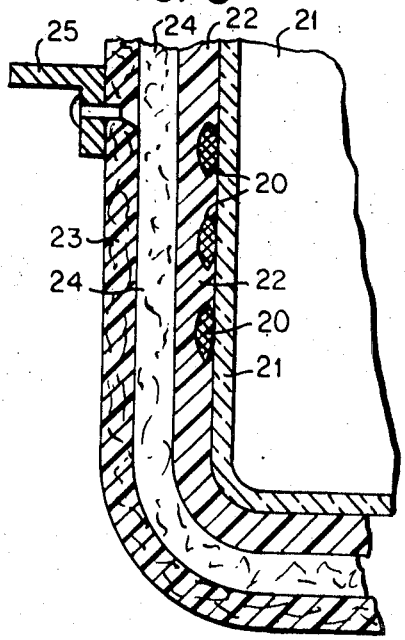
FIG. 3 is a partial and sectional view of a similar container structure, also equipped with induction heating means.
Figure 4:
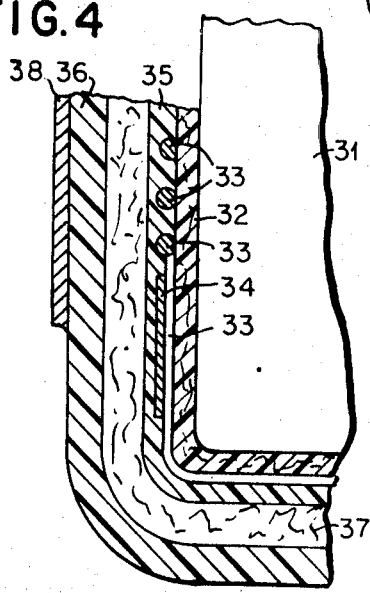
FIG. 4 is another partial and sectional view of a different modification of such a container structure equipped with induction heater means.

As will be seen from FIG. 3, the inductive excitation winding 20 may be mounted directly on the block container 21 of the storage battery where a winding is fixedly attached by a layer of plastic material 22 molded or sprayed onto the container 21 which forms the electrolyte vessel proper of the battery. Flux-guide sheet member can also be fixed to the container structure in this manner, as will be described with reference to FIG. 4. After the plastic embedding material 22 (FIG. 3) is applied, a further box 23, made for example of glass-fiber-reinforced plastic, is placed about the inner container structure and the remaining interspace between the outer box 33 and the inner container 21 is filled with heat-insulating plastic or other material, preferably a plastic foam. This increases the thermal time constant of the storage battery, thus retarding the cooling of the battery. The additional, external box 23 can then be provided with supporting or fastening means such as exemplified at 25. According to another embodiment of the invention, a separate box structure is employed for accommodating the inductive excitation winding and the flux-guide members. This box preferably comprises an inner portion 32 of glass-fiber-reinforced plastic which according to FIG. 4 surrounds the block container 31 proper and upon which the induction heater winding 33 and the flux-guide sheet members 34 are arranged and fixed by a plastic material 35 in the manner described above with reference to FIG. 3. Thereafter, the inner portion 32 with the winding and the flux-guide members is inserted into an outer portion 36 likewise preferably made of glass-fiber-reinforced plastic. The remaining interspace between inner portion 32 and outer portion 36 is thereafter filled with plastic foam 37. As a result, there is produced a composite box or holder structure into which the battery container 31 proper is inserted and which secures high mechanical strength and good additional heat insulation. As explained, the induction winding and the flux guiding members are embedded within the wall structure of the composite box.

To prevent excessively high temperature peaks in the container structure, as may be due to heat losses generated in the excitation winding and to the heat insulation effected by the plastic foam material, it is preferable to coat the excitation winding and the flux guiding sheet members, prior to entering the foam material, with heat-conducting graphite varnish or the like. The coating has the effect of uniformly distributing the heat generated in the excitation winding and to dissipate such heat predominantly through the interior of the composite box structure.

In some cases it is advisable to make the external wall portion of the box structure of metal. For example, the box portion 36 in FIG. 4 may be made of metal or, as shown, may be covered with a metal coating 38. This completely shields the magnetic field in the interior of the storage battery from the environment. By employing magnetically conducting material for or at the outer portion of the box structure, the flux-guide sheet members, or at least some of them, may be omitted because the external metal of the box structure also performs the purpose of a magnetic yoke or flux guide. Space limitations may make it advisable to omit the cover 5 (FIG. 2a). Then the storage battery is preheated only by means of the excitation windings 3 and 4 (or 20 or 33) accommodated within the container structure. This leads to a slight reduction in heating intensity, but the advantages of reduced space requirements and smaller weight of the container structure may outweigh this disadvantage in many cases.

A further embodiment results by accommodating the excitation winding and the flux-guide members directly in the structures of the block containers themselves. This is advantageous especially with block containers of plastic material. In such cases it is advisable to place the complete excitation winding and any flux-guide members into the injection mold for the block container and to thereafter inject the plastic material into the mold so that the winding and, as the case may be, the flux-guide members become embedded in the plastic material of the container structure.

Figure 5:
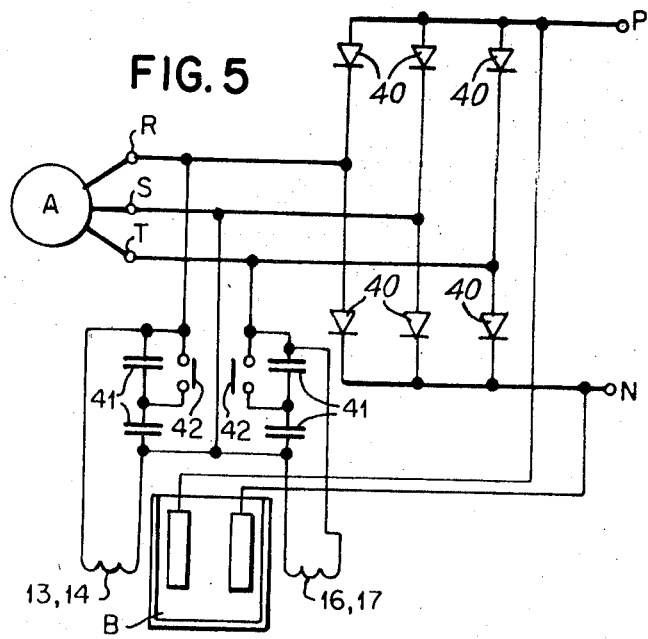
FIG. 5 is a schematic circuit diagram of a battery heating device according to the invention as part of the electrical system on an automotive vehicle.

The energy supply to the inductive heating means according to the invention can be effected in various ways. One way is to connect the inductive heater winding to the three-phase alternator A (FIG. 5) of the vehicle and to connect the inductive heating windings, shown only schematically at 3, 4 and 6, 7 in FIG. 5, directly to the output terminals R, S, T of the three-phase alternator winding ahead of the rectifier diodes 40 which furnish at terminals P and N the direct voltage needed for the lamps and other devices to be energized by direct current aboard the vehicle. The inductive heating device for the battery B in such a system is energized at a varying frequency, namely the one furnished by the alternator A in accordance with the rotating speed of the driving engine. If desired, however, an auxiliary generator or alternator may be used for supplying the inductive heating windings with energy independent of the engine speed.

Figure 6:
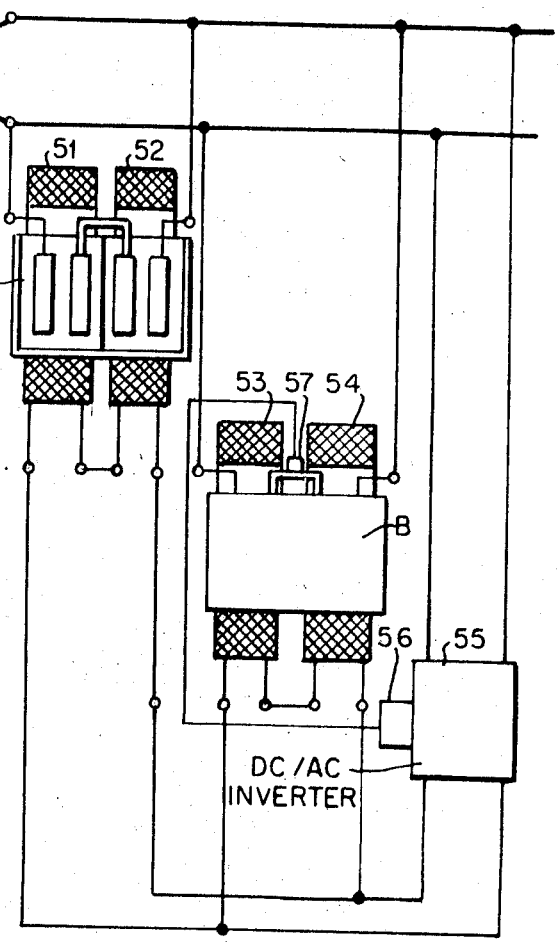
FIG. 6 is an electric circuit diagram of another electrical system of which a battery heating device according to the invention forms part.

Still another way is to connect the inductive heater windings to the direct-current wiring system of the vehicle through a static inverter (direct-current to alternating-current converter) as shown at 55 in FIG. 6. When the inductive heating device is connected to the three-phase alternator of the vehicle (FIG. 5) the heating of the storage battery can be effected only when the engine is running. This, however, affords the assurance that due to the rapid improvement in current storing capacity of the battery, the latter will always remain in a good charging state and for that reason, after cooling to ambient temperature, can furnish a higher cold starting power than when in poorly charged state under otherwise the same conditions. When a vehicle thus equipped and having an always well-charged battery remains at standstill at low ambient temperatures, it is possible, for example, to employ a small inverter to keep the battery by means of its own stored energy on a desired temperature level during an additional prolonged period of time. Preferably, however, the preheating of the storage battery, as a rule, is effected by connecting the induction heating device to an auxiliary generator assembly or to a direct-current generator G through a static inverter (55 in FIG. 6). In the latter case, the energy for preheating may also be taken out of the battery itself. This is so because the partial preheating and the slight specific heat of the lead have the effect that in the region of low temperatures the electrical energy required for preheating is smaller than the energy to be additionally taken out of the battery for this purpose.

The frequency employed for inductive heating of batteries according to the invention is preferably between about 250 Hz and 1,500 Hz, but higher frequencies are also suitable. The particular frequency is preferably chosen in dependence upon the construction of the storage battery. When energizing the inductive heating device from the generator used for lighting purposes on vehicles or from an auxiliary generator, it is in some cases preferable to connect capacitors such as shown at 45 in FIG. 5 in series with, or parallel to, the excitation windings in order to compensate some or all of the reactive power. By adding or disconnecting a portion of the capacitors, for example with the aid of switches or relays such as shown at 42 in FIG. 5, the electrical impedance of the circuit arrangement can be varied, thus also varying the power consumption of the inductive heating device for a given constant voltage. It is further possible to vary the frequency of the auxiliary generator or inverter, thereby also varying the power consumption of the inductive excitation winding due to the resulting variation in impedance of the circuit arrangement. When energizing the inductive heater winding through a static inverter, a compensation of the reactive power of the excitation winding is not necessary if the inverter is provided with free-wheeling diodes. In such cases, too, the power consumption of the excitation winding can be varied by varying the frequency of the static inverter and consequently the impedance of the inductive excitation winding.

It will be understood that the heating of the storage cell can be reduced or terminated as the temperature of the electrode plate rises. For example, the intensity of the heating current can be reduced or the heating current discontinued manually when a given temperature is reached or simply when a given length of heating time has elapsed. However, the reduction in heating intensity or the switching-off of the inductive heater may also be effected automatically by sensing the electrode temperature and controlling the heater current or its frequency in response to the sensor signal. Thus in FIG. 6 a sensor 57, such as a bimetal thermometer is shown placed upon a connector between electrode plates, the output signal being applied to a frequency control 56 of the inverter 55 or simply to the switch which effects the desired reduction or discontinuance of the heating current when a given temperature is exceeded.

FIG. 6 also shows a set of batteries B subdivided into two groups of which each comprises two battery cells. Each cell has its own inductive heater winding. The windings 51/52 of one group are connected in series to the output of the inverter 55. The windings 53/54 of the other group are also connected in series to the inverter and consequently in parallel to the windings 51/52.

Particular advantages are afforded by inductive preheating according to the invention when applied to unfilled, dry-charged batteries prior to activation. It is known that shortly upon activation of dry-charged batteries, especially at low temperatures, the high-current capacity is slight. Due to the alternating field of the inductive heating, all electrode plates of the battery are uniformly preheated. When activating the battery, the electrolyte then penetrating into the pores of the active mass is rapidly heated to a higher temperature by the heat stored in the plates. This affords the assurance that those localities at which the rate-determining reactions of the energy conversion occur, i.e., the boundary faces between electrolyte and active mass, possess approximately the highest temperatures within the storage battery so that the power capacity of the battery attains the highest feasible value.

The inductive heating according to the invention operates with unfilled storage batteries with the same good efficiency as with filled batteries. In contrast thereto, the heating performance with the above-mentioned heating methods heretofore known is very small at unfilled batteries because the heat transfer between the inner wall of the block container and the plate is bad due to the absence of the electrolyte. The known alternating-current heating is completely impossible with unfilled batteries because in this condition the battery cannot receive any current so that no heat losses can occur within the interior of the battery.

To those skilled in the art, it will be obvious upon a study of this disclosure that our invention permits of various modifications and may be given embodiments other than particularly illustrated and described herein, without departing from the essential features of our invention and within the scope of the claims annexed hereto.

We claim:

1. The method of heating storage batteries having parallel electrode plates, such as lead-acid batteries, which comprises subjecting the electrode plates of the battery to an inductive alternating magnetic field oriented relative to the battery so as to have the field direction pass through the respective planes of the plates thus heating the plates by electric current induced therein by the field.

2. The method according to claim 1, wherein the inductive alternating field has a frequency of at least about 250 Hz.

3. The method according to claim 1, wherein the inductive alternating field has a frequency in the range from about 250 Hz to about 1,500 Hz.

4. The method according to claim 1 which comprises reducing the intensity of the alternating field with rising temperature of the battery.

5. The method according to claim 1 which comprises changing the frequency of the alternating field during the heating period.

6. The method according to claim 1 which comprises sensing the temperature in the storage battery, and controlling the intensity of the alternating field in dependence upon the change in the temperature sensed.

7. The method according to claim 1 wherein said battery forms part of an electric power plant having an alternator and rectifier diodes connected to the alternator to provide direct current, and which comprises supplying said inductive alternating field with heating power from said alternator by tapping said power off the output of said alternator ahead of said diodes.

8. The method according to claim 1 for heating a battery on a vehicle having a direct-current supply, which comprises converting direct current from said supply to alternating current, and energizing said inductive field by said converted current.

9. The method according to claim 1 wherein a group of said batteries has respective induction heater windings energized from a three-phase alternator and which comprises connecting said windings in a cyclical three-phase circuit with each other to the three phases of said alternator.

10. The method according to claim 1 wherein a group of said batteries has respective induction heater windings energized from a direct-current line through a direct-current to alternating-current converter, and which comprises connecting said windings in series-parallel connection to said converter.

11. The method according to claim 1 wherein said field is produced by an induction winding and which comprises connecting a capacitance for controlling the reactive impedance and power consumption.

12. Device for heating storage batteries, such as lead-acid batteries, comprising holder means, a battery having electrode plates and being mounted in said holder means when the battery heating device is in operation, electric induction winding means joined with said holder means and having an alternating-current energizing circuit, said winding means being situated on said holder means in surrounding relation to the battery electrode plates with the field-line direction passing through the respective planes of the plates to induce electric short-circuit currents in the electrode plates.

13. Device according to claim 12, wherein said induction winding means comprise a coil having winding turns extending substantially in a plane parallel to that of the electrode plates.

14. In a device according to claim 12, said holder means comprising a storage-battery container structure, said induction winding means being embedded within the walls of said container structure.

15. In a device according to claim 14, said container structure comprising a vessel which forms part of the storage battery proper and has a bottom and side walls, and a cover on top of said vessel, said induction winding means comprising a distributed winding extending at said bottom and side walls, a concentrated winding at the top edges of said vessel, another distributed winding on the surface of said cover, and concentrated windings at the edges of said covers.

16. Device according to claim 15, comprising flux-guide sheet members disposed on said distributed windings at said side walls of said vessel.

17. Device according to claim 16, wherein said flux-guide sheet members are arranged about midway along the height of said vessel and have approximately the same vertical dimension as the electrode plates.

18. In a device according to claim 14, said container structure comprising a vessel which forms part of the storage battery proper and has a bottom and side walls, and a cover on top of said vessel, said induction winding means comprising winding turns located at said bottom and side walls and further winding turns on said cover, a synthetic plastic embedment which fixed said respective winding turns to said vessel, a box surrounding said vessel and forming therewith an interstitial space, and a heat insulation filling said space.

19. In a device according to claim 18, said box being formed of glass-fiber-reinforced plastic.

20. In a device according to claim 14, said container structure comprising an inner vessel which forms part of the battery proper and an outer box structure into which said vessel is inserted and which forms therewith an interstitial space, flux-guide sheet members surrounding said winding means, said winding means and said members being disposed in the region situated between the outer confines of said box and vessel respectively, and heat-insulating foam material filling the voids remaining in said interstitial space.

21. Device according to claim 18 wherein said box has an outer wall surface formed substantially of metal.

22. Device according to claim 18 wherein said box has an outer wall surface formed substantially of magnetically con-